United States Patent
Lee

(10) Patent No.: US 9,727,997 B2
(45) Date of Patent: Aug. 8, 2017

(54) ELECTRONIC DEVICE AND METHOD OF PROVIDING HANDWRITING ANIMATION

(71) Applicant: Samsung Electronics Co., Ltd., Gyeonggi-do (KR)

(72) Inventor: Gi Yong Lee, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 236 days.

(21) Appl. No.: 14/744,979

(22) Filed: Jun. 19, 2015

(65) Prior Publication Data

US 2015/0371425 A1 Dec. 24, 2015

(30) Foreign Application Priority Data

Jun. 19, 2014 (KR) .................. 10-2014-0074883

(51) Int. Cl.
*G06T 13/80* (2011.01)
*G06T 11/20* (2006.01)

(52) U.S. Cl.
CPC ............ *G06T 13/80* (2013.01); *G06T 11/203* (2013.01)

(58) Field of Classification Search
None
See application file for complete search history.

(56) References Cited

U.S. PATENT DOCUMENTS

| | | | | | |
|---|---|---|---|---|---|
| 5,936,637 | A | * | 8/1999 | Seto | G06K 15/02 345/468 |
| 5,956,420 | A | * | 9/1999 | Ikenoue | G06T 9/20 382/164 |
| 6,034,702 | A | * | 3/2000 | Yabuuchi | G06F 3/018 345/471 |
| 6,151,032 | A | * | 11/2000 | Cheng | G06T 11/203 345/469 |
| 6,157,750 | A | * | 12/2000 | Choi | G06T 3/0093 345/468 |
| 6,232,987 | B1 | * | 5/2001 | Choi | G06K 15/02 345/467 |
| 6,661,417 | B1 | * | 12/2003 | Cheng | G06F 17/214 345/469 |
| 6,804,573 | B2 | * | 10/2004 | Goldman | D05B 19/08 700/131 |
| 9,207,858 | B2 | * | 12/2015 | Antonyuk | G06F 3/04883 |

(Continued)

FOREIGN PATENT DOCUMENTS

| JP | 2000-076236 | 3/2000 |
|---|---|---|
| JP | 2003-150144 | 5/2003 |

(Continued)

*Primary Examiner* — Mark Zimmerman
*Assistant Examiner* — Nurun N Flora
(74) *Attorney, Agent, or Firm* — The Farrell Law Firm, P.C.

(57) ABSTRACT

An electronic device for and a method of providing handwriting animation are provided. The electronic device includes an input and output interface configured to receive a text selection signal; and a management module configured to use vector data for stroke data on text to generate at least one piece of masking data, mask the stroke data with the masking data, and sequentially remove the masking data. The method includes checking vector data for stroke data on selected text; generating at least one piece of masking data from the vector data; masking the stroke data with the masking data; and sequentially removing the masking data.

17 Claims, 19 Drawing Sheets

(56) References Cited

U.S. PATENT DOCUMENTS

| | | | | |
|---|---|---|---|---|
| 2003/0024748 A1* | 2/2003 | Dresevic | ............ | G06F 3/04883 |
| | | | | 178/18.01 |
| 2004/0012591 A1* | 1/2004 | Ito | ............................ | G06T 5/30 |
| | | | | 345/470 |
| 2013/0100138 A1* | 4/2013 | Moriyama | ............ | G06T 11/203 |
| | | | | 345/442 |
| 2013/0182956 A1* | 7/2013 | Wang | ................ | G06K 9/00865 |
| | | | | 382/185 |

FOREIGN PATENT DOCUMENTS

| | | |
|---|---|---|
| KR | 10-0938992 | 1/2010 |
| WO | WO 2008/015825 | 2/2008 |

\* cited by examiner

ELECTRONIC DEVICE AND METHOD OF PROVIDING HANDWRITING ANIMATION

PRIORITY

This application claims priority under 35 U.S.C. §119(a) to a Korean Patent Application filed on Jun. 19, 2014, in the Korean Intellectual Property Office and assigned Serial No. 10-2014-0074883, the entire contents of which are incorporated herein by reference.

BACKGROUND

1. Field of the Invention

The present disclosure relates generally to an electronic device and method for providing handwriting animation for input text.

2. Description of the Related Art

In order to provide selected text with handwriting animation, a typical electronic device sequentially outputs an image file for a portion of text forming the text as described above. In this case, since image files should be sequentially output, there is a limitation in that the display speed of selected text decreases.

SUMMARY

The present disclosure has been made to address the above-mentioned problems and disadvantages, and to provide at least the advantages described below. Accordingly, an aspect of the present disclosure provides an electronic device for handwriting animation. Another aspect of the present disclosure provides a method of handwriting animation.

In accordance with an aspect of the present disclosure, an electronic device is provided. The electronic device includes an input and output interface configured to receive a text selection signal; and a management module configured to use vector data for stroke data on text to generate at least one piece of masking data, mask the stroke data with the masking data, and sequentially remove the masking data.

In accordance with another aspect of the present disclosure, a method of handwriting animation is provided. The method includes checking vector data for stroke data on selected text; generating at least one piece of masking data from the vector data; masking the stroke data with the masking data; and sequentially removing the masking data.

BRIEF DESCRIPTION OF THE DRAWINGS

The above and other aspects, features, and advantages of the present disclosure will be more apparent from the following detailed description, taken in conjunction with the accompanying drawings, in which.

DETAILED DESCRIPTION OF EMBODIMENTS OF THE PRESENT INVENTION

Figure 1:
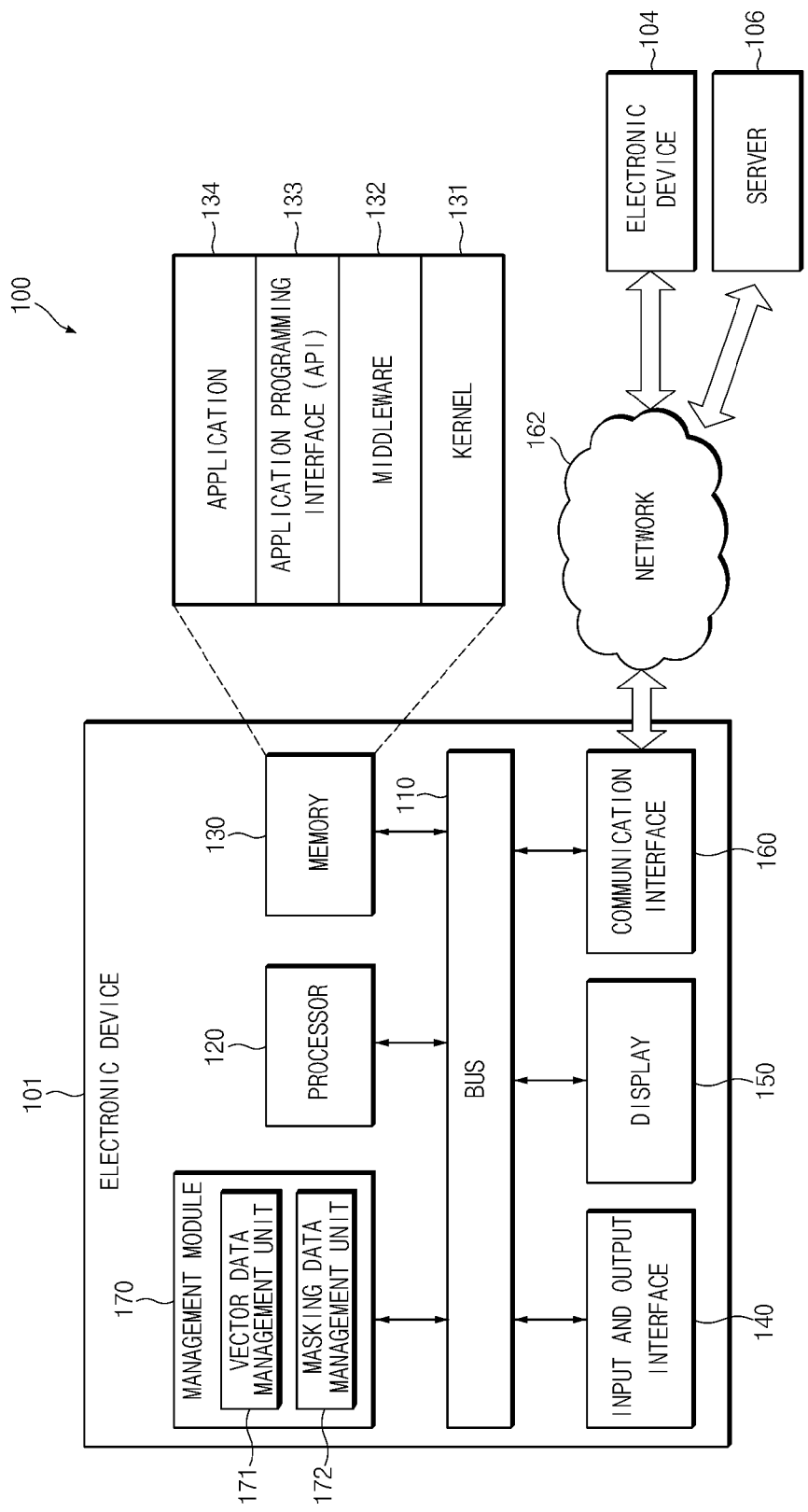
FIG. 1 is a block diagram of an electronic device that provides handwriting animation according to an embodiment of the present disclosure.

Various embodiments of the present disclosure are described below in conjunction with the accompanying drawings. Since various embodiments of the present disclosure may make various modifications and have many embodiments, embodiments of the present disclosure are illustrated in the drawings and related detailed descriptions are disclosed herein. However, the present disclosure is not intended to be limited to the embodiments and it should be understood that the present disclosure covers all modifications, equivalents, and/or replacements that fall within the scope and spirit of the present disclosure. In describing the drawings, similar components are denoted through the use of similar reference numerals.

The expression "include" or "may include" that may be used in describing various embodiments of the present disclosure indicates the presence of a disclosed corresponding function, operation or component but does not exclude one or more functions, operations or components in addition. Furthermore, it should be understood that the term "includes" or "has" in various embodiments of the present disclosure indicates the presence of characteristics, numbers, steps, operations, components, parts or combinations thereof represented in the present disclosure but do not exclude the presence or addition of one or more other characteristics, numbers, steps, operations, components, parts or combinations thereof.

The expression "or" in various embodiments of the present disclosure includes any and all combinations of words enumerated together with the expression. For example, the expression "A or B" may include A, B, or both A and B.

The expression "a first", "a second", "firstly", or "secondly" in various embodiments of the present disclosure may modify various components of the present disclosure but do not limit corresponding components. For example, the expressions above do not limit the order and/or importance of corresponding components. The expressions above may be used to distinguish one component from another component. For example, both a first user device and a second user device are user devices that are mutually different user devices. For example, without departing from the scope of rights of various embodiments of the present disclosure, a first component may be called a second component and similarly, the second component may also be called the first component.

When any component is referred to as being "connected" to or "accessed" by another component, it should be understood that the former can be "directly connected" to the latter, or there may be another component in between. On the contrary, when any component is referred to as being "directly connected" or "directly accessed" by another component, it should be understood that there may be no other component in between.

The terms used in various embodiments of the present disclosure are used only to describe the embodiments and are not intended to limit the present disclosure. The terms in singular form include the plural form unless otherwise specified.

Unless otherwise defined herein, all terms used herein including technical or scientific terms have the same meanings as those generally understood by a person skilled in the art to which the various embodiments of the present disclosure pertain. Terms defined in generally used dictionaries should be construed to have meanings matching contextual meanings in the related art and should not be construed as having an ideal or excessively formal meaning unless otherwise defined in various embodiments of the present disclosure.

An electronic device according to various embodiments of the present disclosure may be a device that includes a text input and display function. For example, the electronic device may include at least one of a smart phone, a tablet Personal Computer (PC), a mobile phone, a video phone, an e-book reader, a desktop PC, a laptop PC, a net book computer, a Personal Digital Assistant (PDA), a Portable Multimedia Player (PMP), a Moving Picture Experts Group Audio Layer 3 (MP3) player, a mobile medical device, a camera, and a wearable device (e.g., a Head-Mounted-Device (HMD) such as electronic glasses, electronic clothing, an electronic bracelet, an electronic necklace, an electronic appcessory, an electronic tattoo, or a smart watch).

According to some embodiments of the present disclosure, the electronic device may be a smart home appliance having a text input and display function. The smart home appliance may include, for example, at least one of a TV, a Digital Video Disk (DVD) player, an audio set, a refrigerator, an air conditioner, a cleaner, an oven, a microwave oven, a washing machine, an air cleaner, a set-top box, a TV box (e.g., Samsung HomeSync™, Apple TV™, or Google TV™), a game console, an electronic dictionary, an electronic key, a camcorder, and an electronic frame.

According to some embodiments of the present disclosure, the electronic device may include at least one of various medical devices (e.g., a Magnetic Resonance Angiography (MRA) device, a Magnetic Resonance Imaging (MRI) device, a Computed Tomography (CT) device, a camera, and an ultrasonicator), a navigation system, a Global Positioning System (GPS) receiver, an Event Data Recorder (EDR), a Flight Data Recorder (FDR), a car infotainment device, electronic equipment for a ship (e.g., a navigation device or gyro compass for a ship), avionics, a security device, a head unit for a vehicle, an industrial or home robot, a financial institution's Automated Teller Machine (ATM) or a store's Point Of Sale (POS) device.

According to some embodiments of the present disclosure, the electronic device may include at least one of a portion of a building/structure or furniture including a communication function, an electronic board, an electronic signature receiving device, a projector, and various measurement devices (e.g., a water, electricity, gas or electric wave measurement device). An electronic device according to various embodiments of the present disclosure may be one of the above-described various devices or combinations of two or more of the above-described various devices. Moreover, an electronic device according to various embodiments of the present disclosure may be a flexible device. Moreover, it is obvious to a person skilled in the art that electronic devices according to various embodiments of the present disclosure are not limited to the above-described devices.

In the following, electronic devices according to various embodiments of the present disclosure are discussed with reference to the accompanying drawings. The term "user" used in various embodiments of the present disclosure may indicate a person who uses an electronic device, or a device (e.g., an artificial-intelligence electronic device) that uses the electronic device.

FIG. 1 is a block diagram of an electronic device 101 that provides handwriting animation according to an embodiment of the present disclosure.

Referring to FIG. 1, an electronic device 101 in a network environment 100 that includes the electronic device 101 according to an embodiment of the present disclosure includes a bus 110, a processor 120, a memory 130, an input and output interface 140, a display 150, a communication interface 160, and a management module 170. The management module 170 includes a vector data management unit 171 and a masking data management unit 172. The electronic device 101 checks vector data for stroke data on text corresponding to a text selection signal received via the input and output interface 140. The electronic device 101 uses the vector data to generate at least one piece of masking data. The electronic device 101 sequentially removes at least one piece of masking data that masks stroke data. As the masking data is partially removed in an order, stroke data masked by the masking data is partially displayed and, thus, it is possible to provide a user with handwriting animation.

The bus 100 is a circuit that mutually connects the above-described components and transfers communication (e.g., a control message) between the above-described components.

The processor 120 receives a command from the above-described components (e.g., the memory 130, the input and output interface 140, the display 150, the communication interface 160 and the management module 170) via the bus 110, decrypts a received command and performs a calculation or data processing according to a decrypted command, for example.

The memory 130 stores a command or data received from the processor 120 or other components (e.g., the input and output interface 140, the display 150, the communication interface 160 and the management module 170) or generated by the processor 120 or other components. The memory 130 includes programming modules such as a kernel 131, a middleware 132, an Application Programming Interface (API) 133 or an application 134, for example. Each of the above-described programming modules may be configured in software, firmware, hardware or a combination of two or more thereof.

The memory 130 stores a True Type Font (TTF) file (hereinafter, referred to as a "first TTF file"). The first TTF file includes at least one stroke forming stroke data, the order of strokes, the contour of the stroke data and vector data. The contour may vary depending on the font type and size of stroke data and be formed as a closed curve. The vector data includes a plurality of coordinates defined from the contour, and at least one curve or straight line that forms the contour by mutually connecting the plurality of coordinates. The memory 130 stores a TTF file (hereinafter, referred to as a "second TTF file") including additional information input from a user via the input and output interface 140 or provided from the electronic device 104 or the server 106. The second TTF file may include time information generating at least one stroke that is the basis of stroke data, delay time information between strokes, or speed or acceleration information when generating a stroke. The second TTF file may include a stroke included in the first TTF file, the order of strokes, the contour of stroke data, and vector data. The second TTF file includes central line information that is checked on the basis of the contour of stroke data, and maximum length information. In this case, the maximum length information may mean information on a longest length that is orthogonal to the central line among coordinates defined by the contour. The central line information is required for generating masking data and is described below in detail.

The kernel 131 controls or manages system resources (e.g., the bus 110, the processor 120 or the memory 130) used for performing an operation or function implemented in other remaining programming modules such as middleware 132, an API 133, or an application 134. Also, the kernel 131 provides an interface that enables the middleware 132, the API 133 or the application 134 to access and control or manage the separate components of the electronic device 101.

The middleware 132 acts as a go-between so that the API 133 or the application 134 can communicate with the kernel 131 to transmit and receive data. Also, the middleware 132 may use, for example, a method of allocating priority for using the system resource (e.g., the bus 110, the processor 120 or the memory 130) of the electronic device 101 to at least one of the application 134 to perform a control (e.g., scheduling or load balancing) on task requests received from the application 134.

The API 133 is an interface for enabling the application 134 to control a function provided from the kernel 131 or the middleware 132 and includes at least one interface or function (e.g., a command) for a file control, a window control, image processing or a text control.

The input and output interface 140 transfers a command or data input from a user via an input and output device (e.g., a sensor, a keyboard or a touch screen) to the processor 120, the memory 130, the communication interface 160 or the management module 170 via the bus 110, for example. For example, the input and output interface 140 provides the processor 120 with data on a user touch input via a touch screen. Also, the input and output interface 140 outputs, via the input and output device (e.g., a speaker or a display), a command or data received from the processor 120, the memory 130, the communication interface 160, or the management module 170 via the bus 110, for example. When text to be input is selected by a user, the input and output interface 140 transfers selected text to the management module 170.

The display 150 provides a user with various pieces of information (e.g., multimedia data, text data, etc.). For example, the display 150 may display various pieces of text data that operate according to the control of the management module 170. The display 150 displays text data on text selected by the user via the input and output interface according to the control of the management module 170.

The communication interface 160 establishes communication between the electronic device 101 and an external device (e.g., the electronic device 104 or the server 106). For example, the communication interface 160 may connect to a network 162 via wireless or wired communication to communicate with an external device. The wired communication includes at least one of a Universal Serial Bus (USB), High Definition Multimedia Interface (HDMI), Recommended Standard 232 (RS-232) or Plain Old Telephone Service (POTS) scheme. The wireless communication includes at least one of a Wireless Fidelity (WiFi), Bluetooth (BT), Near Field Communication (NFC), Global Positioning System (GPS) or cellular communication (e.g., Long Term Evolution (LTE), LTE Advanced (LTE-A), Code Division Multiple Access (CDMA), Wideband CDMA (WCDMA), Universal Mobile Telephone System (UMTS), Wireless Broadband (WiBro) or Global System for Mobile communications (GSM)) scheme.

According to an embodiment of the present disclosure, the network 162 is a telecommunication network. The telecommunication network includes at least one of a computer network, the Internet, the Internet of Things (IoT) or a telephone network. According to an embodiment of the present disclosure, a protocol (e.g., a transport layer protocol, a data link layer protocol or a physical layer protocol) for communication between the electronic device 101 and the external device is supported by at least one of the application 134, the Application Program Interface 133, the middleware 132, the kernel 131 or the communication interface 160. The communication interface 160 receives at least one of at least the first TTF file and the second TTF file from the external device via the wired or wireless communication and provides the management module 170 with a received file.

The management module 170 processes at least some of the information obtained from the other components (e.g., the processor 120, the memory 130, the input and output interface 140 and the communication interface 160) and provides a user with processed information via various methods. For example, the management module 170 may control at least some of the functions of the electronic device 101 by using, or independent of, the processor 120 so that the electronic device 101 operates depending on the external device. When text is selected by a user via the input and output interface 140, the management module 170 checks stroke data on the text selected. The management module 170 uses vector data for checked stroke data to generate at least one piece of masking data, and mask stroke data with the generated masking data. The masking data is generated based on the contour of the stroke data and a central line checked on the basis of the vector data. Since the management module 170 sequentially removes masking data in the order of strokes, it displays the stroke data as if the stroke data were input to the display 150 based on the order of strokes.

According to an embodiment of the present disclosure, the management module 170 receives a selection signal for text to be output from a user via the input and output interface 140, and the vector data management unit 170 checks stroke data corresponding to selected text in the first TTF file stored in the memory 130. The vector data management unit 171 checks stroke data depending on the font type (e.g., Gungsuh type, Gothic type, etc.) and font size of a text preset when the text is selected. The vector data management unit 171 checks the contour of checked stroke data and vector data.

The masking data management unit 172 uses a checked contour and vector data to generate at least one piece of masking data. The masking data management unit 172 checks whether the second TTF file in the memory 130 includes central line information on stroke data and maximum length information. When the information is included, the masking data management unit 172 uses the central line information and the maximum length information to generate masking data. When the information is not included, the masking data management unit 172 uses a contour and vector data to obtain the information. For example, the masking data management unit 172 checks a central point among a plurality of coordinates defined from the contour. The masking data management unit 172 connects a plurality of checked central points to obtain the central line of stroke data.

When the central line of the stroke data is obtained, the masking data management unit 172 checks for a maximum length having a longest length orthogonal to the central line from among a plurality of coordinates defined from a contour. The masking data management unit 172 generates a new contour with a checked maximum length. The masking data management unit 172 generates masking data on stroke data with the new contour. The masking data management unit 172 additionally stores an obtained central line and the maximum length in the second TTF file.

The masking data management unit 172 displays masking data generated on a masking data layer and displays stroke data on a stroke data layer. In the memory 130, respective memory spaces for the masking data layer and the stroke data layer are allocated.

The masking data management unit 172 sequentially removes the masking data displayed on the masking data layer in an order. When the masking data is sequentially removed, the masking data management unit 172 sequentially displays, on a display layer, stroke data corresponding to a region from which the masking data has been removed. When the removal of the masking data displayed on the masking data layer is completed, the masking data management unit 172 accumulates and draws stroke data corresponding to the masking data on a text data layer. When the removal of the masking data is completed, the masking data management unit 172 clears the masking data layer and the stroke data layer. In the memory 130, memory space for the text data layer is allocated.

When accumulated text data is the same as stroke data on text corresponding to a selection signal, the masking data management unit 172 recognizes that the generation of the text data is completed. When the generation of the text data is completed, the masking data management unit 172 clears the display layer. When the accumulated text data is not same as the stroke data, the masking data management unit 172 checks masking data and stroke data that corresponds to the next stroke of text data drawn on the stroke data layer. The masking data management unit 172 displays checked masking data and stroke data on respective layers. The masking data management unit 172 operates to complete the generation of text data as above until the accumulated text data is the same as the stroke data.

According to an embodiment of the present disclosure, the electronic device 101 displaying text according to the present disclosure includes the input and output interface 140 receiving a text selection signal and a management module 170 that uses vector data for stroke data on text to generate at least one piece of masking data, masks stroke data with masking data and sequentially removes the masking data. The management unit 170 allocates memory for the masking data and memory for the stroke data.

The management module 170 accumulates stroke data corresponding to masking data in the order that the masking data is removed, to generate text data.

The management module 170 checks the contour of stroke data and check vector data that includes a plurality of coordinates defined from the contour and one of at least one straight line or curve that connects the coordinates. The management module 170 uses the plurality of coordinates to check at least one central point, and connects the central points to obtain the central line of stroke data. The management module 170 uses a maximum length having a longest length orthogonal to a central line among a plurality of coordinates to generate masking data. The management module 170 checks a point of inflection at which two or more central lines form a user-defined angle. The electronic device 101 further includes the memory 130 that stores additional information on stroke data, and the management module 170 removes masking data based on the additional information. The additional information may include time information when at least one stroke forming stroke data is generated, delay time information between at least one stroke, and information on any one of a speed or acceleration when a stroke is generated.

FIGS. 2A to 2E illustrate a method of generating masking data on the alphabet letter "i" according to an embodiment of the present disclosure.

Figure 2A:
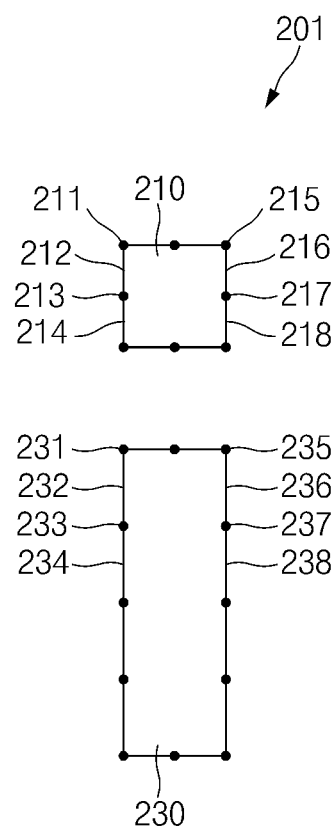
FIGS. 2A to 2E illustrate a method of generating masking data on the alphabet letter "i" according to an embodiment of the present disclosure.
Figure 2B:
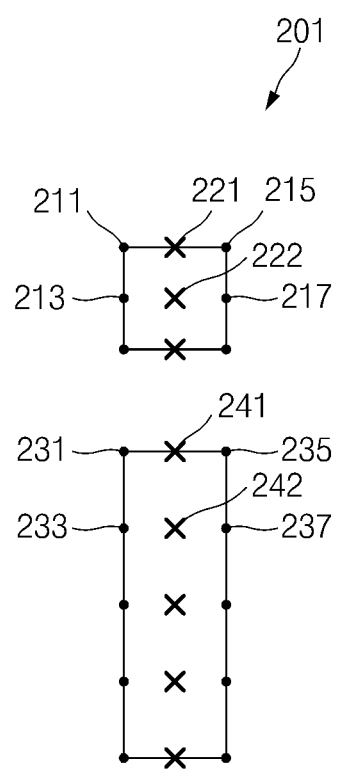
Figure 2C:
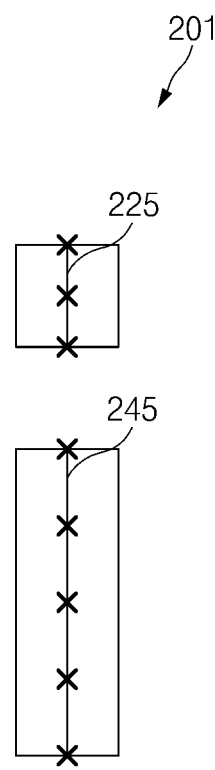
Figure 2D:
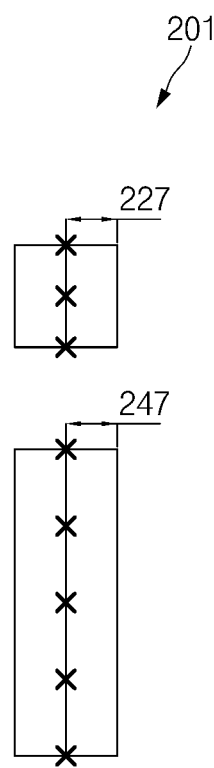
Figure 2E:
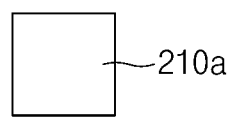
Figure 2E:
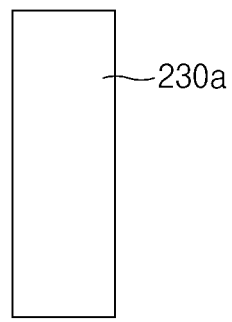

Referring to FIGS. 1 to 2E, when a user selects, for example, lower-case alphabet letter "i" via the input and output interface 140, the electronic device 101 checks a preset font type and font size. The electronic device 101 checks stroke data 201 on the alphabet letter "i" in a True Type Font file (hereinafter, referred to as a "first TTF file") stored in the memory 130 based on a checked font type and font size. The electronic device 101 checks at least one stroke that is the basis of the stroke data 201 on text (e.g., the alphabet letter "i") selected from the first TTF file, the order of strokes, the contour of stroke data and vector data. The vector data includes a plurality of coordinates defined from the contour of the stroke data 201, and any one of at least one curve or straight line that forms a contour by mutually connecting the plurality of coordinates. For example, the vector data of a first stroke 210 that is based on the order of strokes of the lower-case alphabet letter "i" selected as shown in FIG. 2A includes a plurality of coordinates 211, 213, 215, and 217 and a plurality of straight lines 212, 214, 216, and 218 that connect the coordinates 211, 213, 215, and 217. Vector data of a second stroke 230 that is based on the order of strokes of a selected lower-case alphabet letter "i" includes a plurality of coordinates 231, 233, 235, and 237 and a plurality of straight lines 232, 234, 236, and 238 that connect the coordinates 231, 233, 235, and 237.

The electronic device 101 checking the contour and vector data of the stroke data 201 as shown in FIG. 2A obtains the central points 221, 222, 241, and 242 and central lines 225 and 245 of the stroke data 201 as shown in FIGS. 2B and 2C. For example, the electronic device 101 checks the central points 221 and 222 among the plurality of coordinates 211, 213, 215, and 217 from vector data included in the first stroke 210 as shown in FIG. 2B. The electronic device 101 checks the central points 241 and 242 among the plurality of coordinates 231, 233, 235 and 237 in vector data included in the second stroke 230 as shown in FIG. 2B. The electronic device 101 connects checked central points 221, 222, 241 and 242 to obtain the central line 225 or 245 of each stroke 210 and 230 as shown in FIG. 2C. For example, the electronic device 101 uses any one of a straight line or curve included in vector data to check the central point 222 or 242 between two coordinates 213 and 217 or 233 and 237 that are located in a closest distance among coordinates not directly connected. When coordinates directly connected by using any one of a straight line and a curve in vector data form the start point or end point of the central lines 225 and 245, the electronic device 101 checks the central lines 225 and 245 on a contour.

When obtaining the central lines 225 and 245 is completed, the electronic device 101 checks coordinates orthogonal to the central lines 225 and 245 as shown in FIG. 2D. In this case, the coordinates are ones that are defined on a contour and included in vector data. The electronic device 101 checks a maximum length 227 or 247 orthogonal to the central line 225 or 245 as shown in FIG. 2D. When a second TTF file does not include a central line or a maximum length, the electronic device 101 checks the central line and the maximum length via processes in FIGS. 2A to 2D and stores them in the second TTF file.

The electronic device 101 uses a maximum length 227 checked on the first stroke 210 to generate a new contour of the central line 225 of the first stroke 210 and generates masking data 210a of the first stroke 210 as shown in FIG. 2E. The electronic device 101 generates a new contour for a maximum length 247 checked on the second stroke 230 and generates masking data 230a of the second stroke 230 as shown in FIG. 2E. The electronic device 101 checks which of respective maximum lengths 227 and 247 checked on the first stroke 210 and the second stroke 230 is longer, and generates masking data of the first stroke 210 and the second stroke 230 with a checked maximum length.

FIGS. 3A to 3F illustrate a method of providing handwriting animation on the alphabet letter "i" according to an embodiment of the present disclosure. Referring to FIGS. 1 to 3F, the electronic device 101 displays, on a masking data layer ML, masking data 210a corresponding to the first stroke 210 from masking data 210a and 230a generated in FIG. 2E, in FIG. 3A. The electronic device 101 displays the stroke data 201 corresponding to the first stroke 210 on a stroke data layer SL. The electronic device 101 allocates memory for the masking data layer ML and memory for the stroke data layer SL.

Figure 3A:
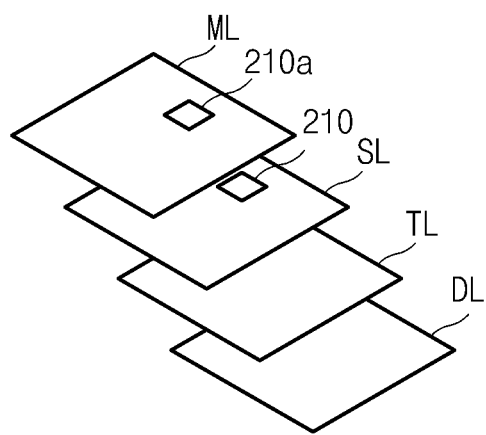
FIGS. 3A to 3F illustrate a method of providing handwriting animation on the alphabet letter "i" according to an embodiment of the present disclosure.
Figure 3B:
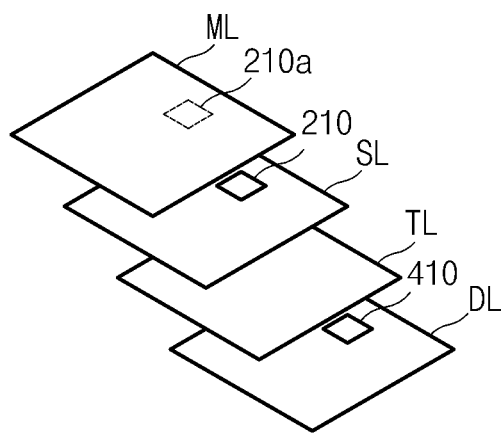

The electronic device 101 removes the masking data 210a displayed on the masking data layer ML as shown in FIG. 3B. When the masking data 210a is removed, the electronic device 101 displays, on a display layer DL, the first stroke 210 of the stroke data 201 corresponding to a region from which the masking data 210a has been removed, as represented by reference numeral 410. When the removal of the masking data 210a displayed on the masking data layer ML is completed, the electronic device 101 clears the masking data layer ML and the stroke data layer SL. When the removal of the masking data 210a displayed on the masking data layer ML is completed, the electronic device 101 draws the first stroke 210 on a text data layer TL as represented by reference numeral 310 in FIG. 3C. The electronic device 101 allocates memory for the text data layer TL.

Figure 3C:
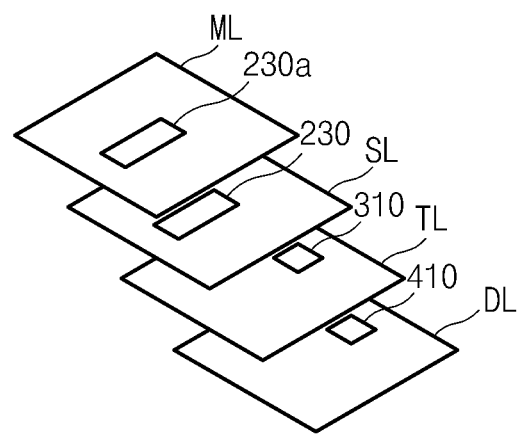
Figure 3D:
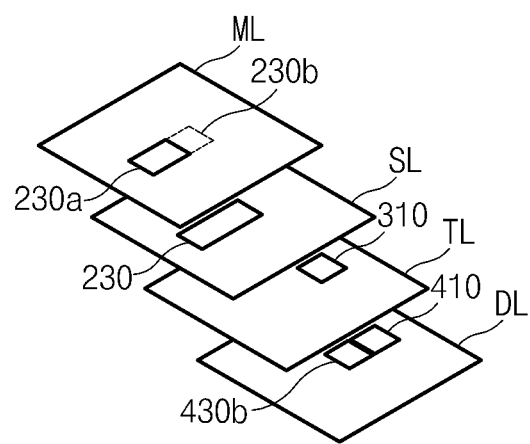

The electronic device 101 displays the masking data corresponding to the second stroke 230 and the second stroke 230 of the stroke data 201 on the clear masking data layer ML and the clear stroke data layer SL as shown in FIG. 3C. The electronic device 101 removes the masking data 230a displayed on the masking data layer ML, for a time as shown in FIG. 3D. When a portion 230b of the masking data 230a is removed, the electronic device 101 displays, on the display layer DL, a region 230b of the second stroke 230 displayed on the stroke data layer SL from which the masking data 230a has been removed, as represented by reference numeral 430b.

Figure 3E:
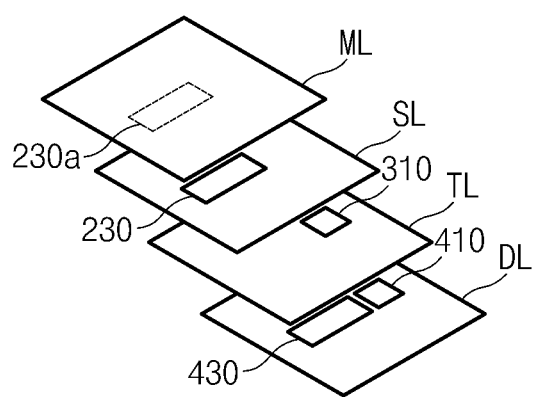
Figure 3F:
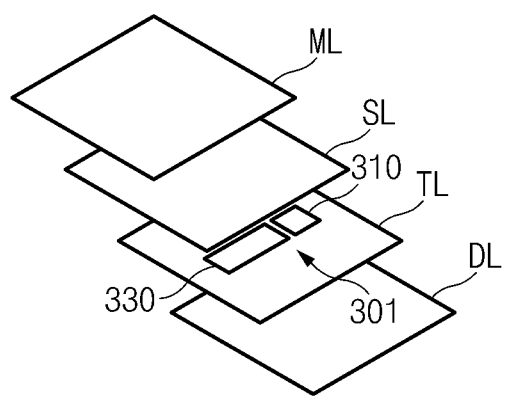

When the removal of the masking data 230a displayed on the masking data layer ML is completed as shown in FIG. 3E, the electronic device 101 displays, on the display layer DL, the second stroke 230 displayed on the stroke data layer SL as represented by reference numeral 430. When the removal of the masking data 230a displayed on the masking data layer ML is completed as shown in FIG. 3E, the electronic device 101 clears the masking data layer ML and the stroke data layer SL as shown in FIG. 3F. When the removal of the masking data 230a is completed, the electronic device 101 accumulates and draws text data 330 on the second stroke 230 on the text data layer TL on which text data 310 on the first stroke 210 is drawn, as shown in FIG. 3F. The electronic device 101 accumulates and draws, on the text data layer TL, the text data 310 and 330 on the strokes 210 and 230 forming the stroke data 201 to complete the generation of the text data 301 as shown in FIGS. 3A to 3E. When the generation of the text data 301 is completed as shown in FIG. 3F, the electronic device 101 clears the display layer DL.

When to remove the masking data 210a of the first stroke 210 and the masking data 230a of the second stroke 230 by the electronic device 101 are based on time information to display a stroke and speed or acceleration information when the stroke is displayed that are included in the second TTF file. When to display the masking data 230a and the stroke data 230 of the second stroke 230 on respective layers after the electronic device 101 clears respective layers on which the masking data 210a and the stroke data 201 of the first stroke 210 are displayed are based on the delay time information between strokes included in the second TTF file.

Figure 4A:
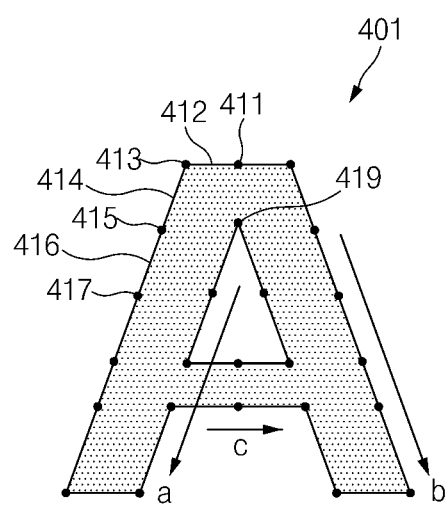
FIGS. 4A to 4E illustrate a method of generating masking data on the alphabet letter "A" according to an embodiment of the present disclosure.
Figure 4B:
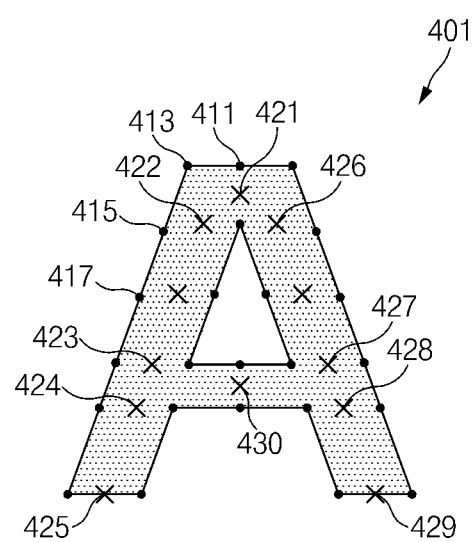

FIGS. 4A to 4E illustrate a method of generating masking data on the alphabet letter "A" according to an embodiment of the present disclosure. Referring to FIGS. 1 to 4E, when a user selects, for example, the upper-case alphabet letter "A" through the input and output interface 140, the electronic device 101 checks a preset font type and font size. The electronic device 101 checks stroke data 401 on the alphabet letter "A" in a true type font file (hereinafter, referred to as a "first TTF file") stored in the memory 130 based on a checked font type and font size. The electronic device 101 checks at least one stroke that is the basis of the stroke data 401 on text (e.g., the alphabet letter "A") selected from the first TTF file, the order of strokes, the contour of stroke data and vector data. The vector data includes a plurality of coordinates defined from the contour of the stroke data 401, and any one of at least one curve or straight line that forms a contour by mutually connecting the plurality of coordinates. For example, vector data on a selected upper-case alphabet letter "A" includes a plurality of coordinates 411, 413, 415, 417, and 419 and at least one straight line 412, 414, or 416 that connects the plurality of coordinates 411, 413, 415, 417, and 419 as shown in FIG. 4A. The electronic device 101 checking the contour and vector data of the stroke data 401 as shown in FIG. 4A checks the central points 421 to 430 of the stroke data 401 as shown in FIG. 4B.

Figure 4C:
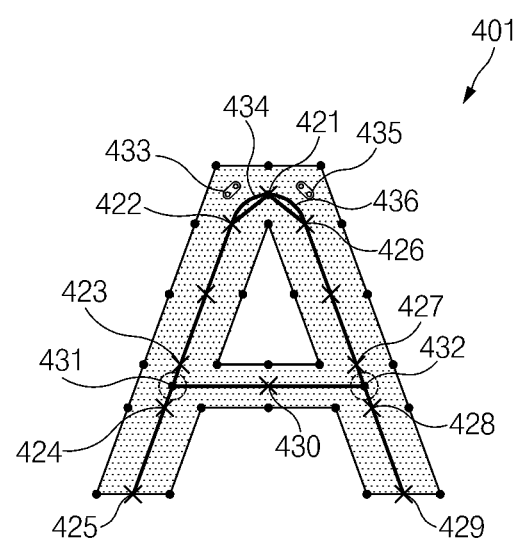

The electronic device 101 connects checked central points 421 to 430 in the order of arrows "a" to "c" to obtain a central line. Referring to FIG. 4B, when the electronic device 101 connects the central points 421 to 425 along arrow "a" or the central points 421 to 426 and 429 along arrow "b," it is possible to check that a central line for arrows "a" and "b" is not obtained as a straight line due to the central points 421, 422 and 426. The electronic device 101 connects the central points 421, 422 and 426 of which the central line is not obtained as a straight line, to be a curve as shown in FIG. 4C, or connects the central points 421 and 422 and the central points 421 and 426 by straight lines, respectively.

Figure 4D:
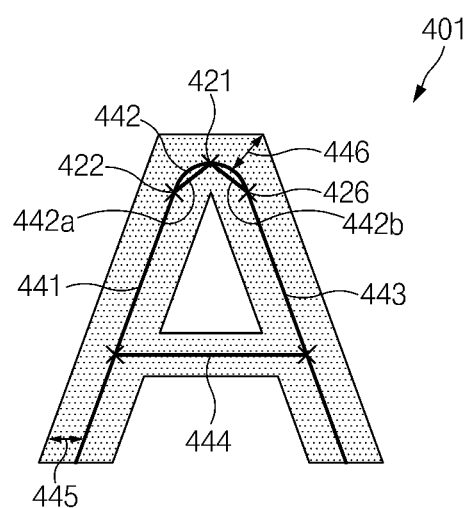
Figure 4E:
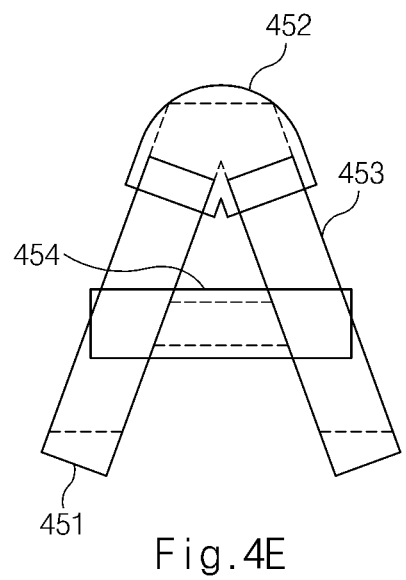

When the central points 421, 422 and 426 are connected by a curved line, the electronic device 101 obtains four central lines 441 to 444 that connect the central points 422 to 425; 422, 421 and 426; 426 to 429; and 431 and 432 as shown in FIG. 4D. The electronic device 101 generates four pieces of masking data 451 to 454 with four central lines 441 to 444 obtained, as shown in FIG. 4E. When the central points 422 and 421 and the central points 421 and 426 are connected by straight lines respectively, the electronic device 101 obtains five central lines 441, 442a, 442b, 443, and 444 that connect the central points 422 to 425; the central points 422 and 421; the central points 421 and 426; the central points 426 to 429; and the central points 431 to 432 as shown in FIG. 4D. The electronic device 101 generates five pieces of masking data (not shown) with five central lines 441, 442*a*, 442*b*, 443, and 444 obtained.

When the electronic device 101 connects the central points 422, 421 and 426 by a curved line, it checks for a point of inflection 421 generated so that the curved line forms an angle, and reflects it to obtain a curved central line. The electronic device 101 instantiates two virtual points at point 433 around the central points 421 and 422 and connects the central points 421 and 422 around the point 433 by a curved line such as a line 434 as shown in FIG. 4C. In this case, the curvature of the curved line varies depending on the location of the point 433. The electronic device 101 instantiates two virtual points at point 435 around the central points 421 and 426 and connects the central points 421 and 426 around the point 435 to form a curved line such as a line 436. In this case, the two virtual points corresponding to points 433 and 435, respectively, are included in vector data. When cross points 431 and 432 at which two or more central points cross are checked, the electronic device 101 reflects them to obtain a central point. The electronic device 101 connects checked central points to obtain the central lines 441 to 444 of the stroke data 401 as shown in FIG. 4D.

The electronic device 101 checks a plurality of coordinates orthogonal to the central lines 441 to 444 among a plurality of coordinates included in vector data checked in FIG. 4A. The electronic device 101 checks maximum lengths 445 and 446 being longest lengths orthogonal to the central lines 441 to 444 as shown in FIG. 4D. The electronic device 101 uses the maximum length 445 checked from the central lines 441, 443 and 444 linearly formed to generate new contours of the central lines 441, 443 and 444. The electronic device 101 generates masking data 451, 453, and 454 as shown in FIG. 4E with a new contour. The electronic device 101 uses the maximum length 446 checked from the curved central line 442 to generate a new contour of the central line 442. The electronic device 101 generates masking data 452 as shown in FIG. 4E with a new contour. The electronic device 101 uses the maximum length 446 checked from the central lines 441 to 444 irrespective of a curve or a straight line to generate new contours of the central lines 441 to 444 to generate masking data.

Figure 5:
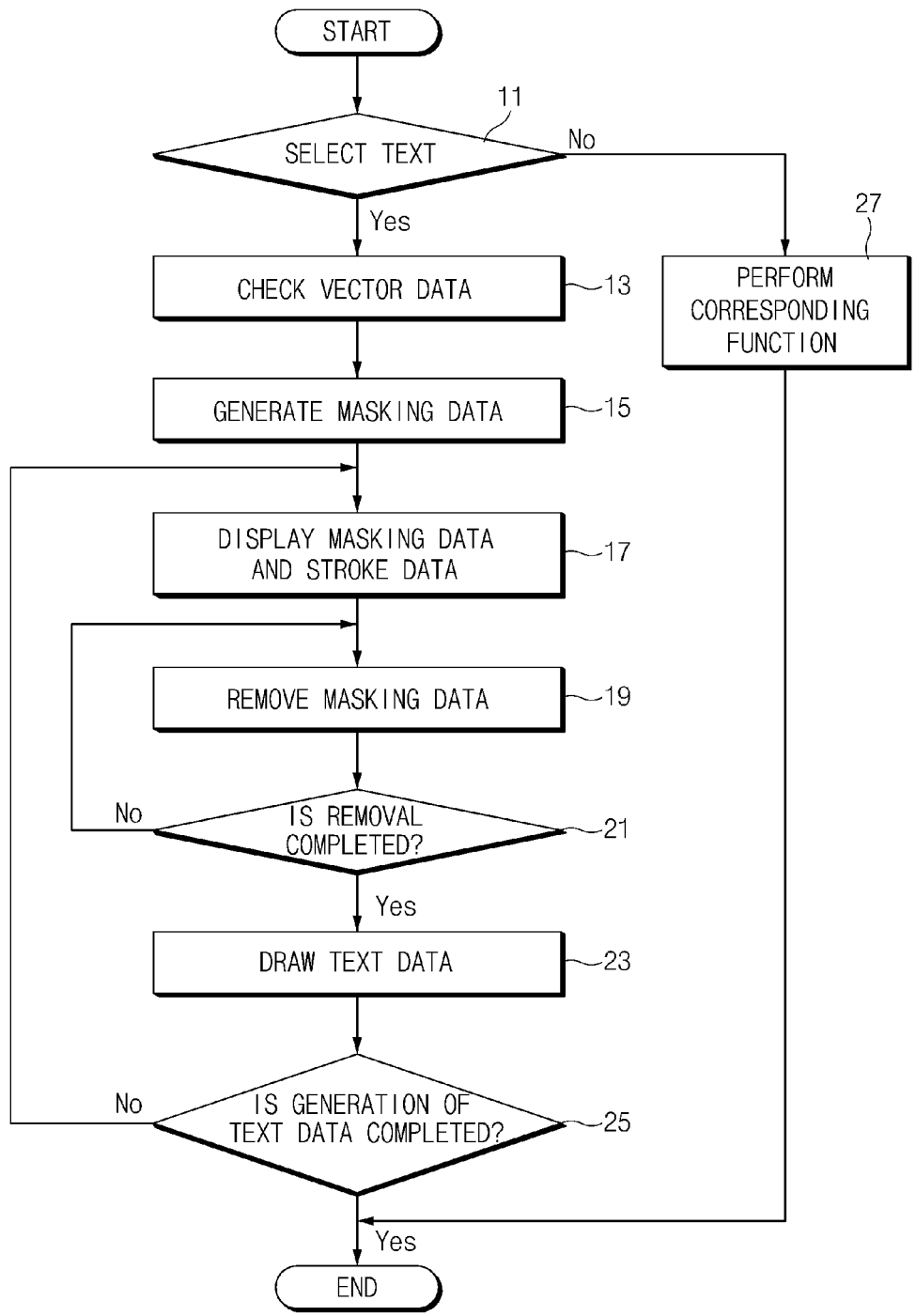
FIG. 5 is a flowchart of a method of providing handwriting animation according to an embodiment of the present disclosure.

FIG. 5 is a flowchart of a method of providing handwriting animation according to an embodiment of the present disclosure.

Referring to FIGS. 1 to 5, the management module 170 checks whether a user selects text to be displayed through the input and output interface 140 in step 11. When the text is selected in step 11, the vector data management unit 171 of the management unit 170 performs step 13 described below. When the text is not selected in step 11, the management module 170 performs step 27. In step 27, the management module 170 continues to perform a function that the electronic device 101 is performing, or displays a standby screen on the display 150.

In step 13, the vector data management unit 171 checks vector data corresponding to selected text. The vector data management unit 171 checks a preset font type and font size, and the vector data management unit 171 checks stroke data corresponding to text selected from a true type font (TTF) file (hereinafter, referred to as a "first TTF file") stored in the memory 130. The first TTF file includes at least one stroke being the basis of stroke data, the order of strokes, the contour of the stroke data and vector data. The vector data management unit 171 checks the contour of checked stroke data and vector data. The vector data includes a plurality of coordinates defined from the contour of the stroke data, and any one of at least one curved or straight line that forms a contour by mutually connecting the plurality of coordinates.

In step 13, when the vector data is checked as described above, the masking data management unit 172 uses vector data to generate at least one piece of masking data in step 15. The masking data management unit 172 uses the contour and the vector data checked in step 13 to obtain the central line of stroke data. The masking data management unit 172 checks a central point among a plurality of coordinates defined from the contour. The masking data management unit 172 connects a plurality of checked central points to obtain the central line of stroke data. When obtaining the central line is completed, the masking data management unit 172 checks some coordinates orthogonal to the central line among the plurality of coordinates. In this case, the masking data management unit 172 generates a new contour of which the maximum length is a longest length orthogonal to the central line. The masking data management unit 172 generates masking data on stroke data with a new contour and store generated data in a second TTF file. In this case, when the second TTF file includes central line information and maximum length information, the masking data management unit 172 uses the information to generate masking data.

In step 17, the masking data management unit 172 displays masking data on a masking data layer and displays stroke data on a stroke data layer. In the memory 130, respective memory locations for the masking data layer and the stroke data layer are allocated.

In step 19, the masking data management unit 172 removes masking data displayed on the masking data layer. When the masking data is sequentially removed, the masking data management unit 172 sequentially displays, on a display layer, stroke data corresponding to a region from which the masking data is removed.

In step 21, the masking data management unit 172 performs step 23 when the removal of the masking data is completed, and returns to step 19 when removal of the masking data is not completed.

In step 23, the masking data management unit 172 accumulates and draws stroke data corresponding to masking data on a text data layer. When the removal of the masking data is completed, the masking data management unit 172 clears the masking data layer and the stroke data layer. In the memory 130, memory space for the text data layer is allocated.

In step 25, when accumulated text data is the same as stroke data on a text input selected in step 11, the masking data management unit 172 recognizes that the generation of the text data is completed. When the generation of the text data is completed, the masking data management unit 172 clears the display layer and ends the above method of FIG. 5. When it is recognized that the generation of the text data is not completed, the masking data management unit 172 returns to step 17. In step 17, the masking data management unit 172 displays, on a clear masking data layer and a clear stroke data layer, masking data and stroke data corresponding to the next stroke of text data drawn on the text data layer. The masking data management unit 172 repetitively performs the above steps until the generation of text data is completed.

According to an embodiment of the present disclosure, a method of providing handwriting animation according to the present disclosure includes a step of checking vector data for stroke data on selected text, a step of generating at least one piece of masking data from the vector data, a step of masking the stroke data with masking data and a step of sequentially removing the masking data. Subsequent to the step of sequentially removing the masking data, the method may further include a step of accumulating the stroke data corresponding to the masking data to generate text data in the order that the removal of the masking data is completed.

The step of checking the vector data includes steps of checking the contour of the stroke data and checking vector data that includes a plurality of coordinates defined from the contour and any one of at least one straight line or curved line that connects the coordinates.

The step of generating at least one piece of masking data includes steps of using the plurality of coordinates to check at least one central point, connecting the central points to obtain the central line of at least one piece of stroke data, checking a maximum length being a longest length orthogonal to the central line among the plurality of coordinates, and using the maximum length to generate the masking data. In this case, the step of generating at least one piece of masking data further includes a step of checking a point of inflection at which two or more central lines form an angle. The step of sequentially removing the masking data further includes a step of checking additional information that includes time information generating at least one stroke forming the stroke data, delay time information between at least one stroke, and information on any one of a speed or acceleration when a stroke is generated, and includes a step of sequentially removing the masking data based on checked additional information.

Figure 6:
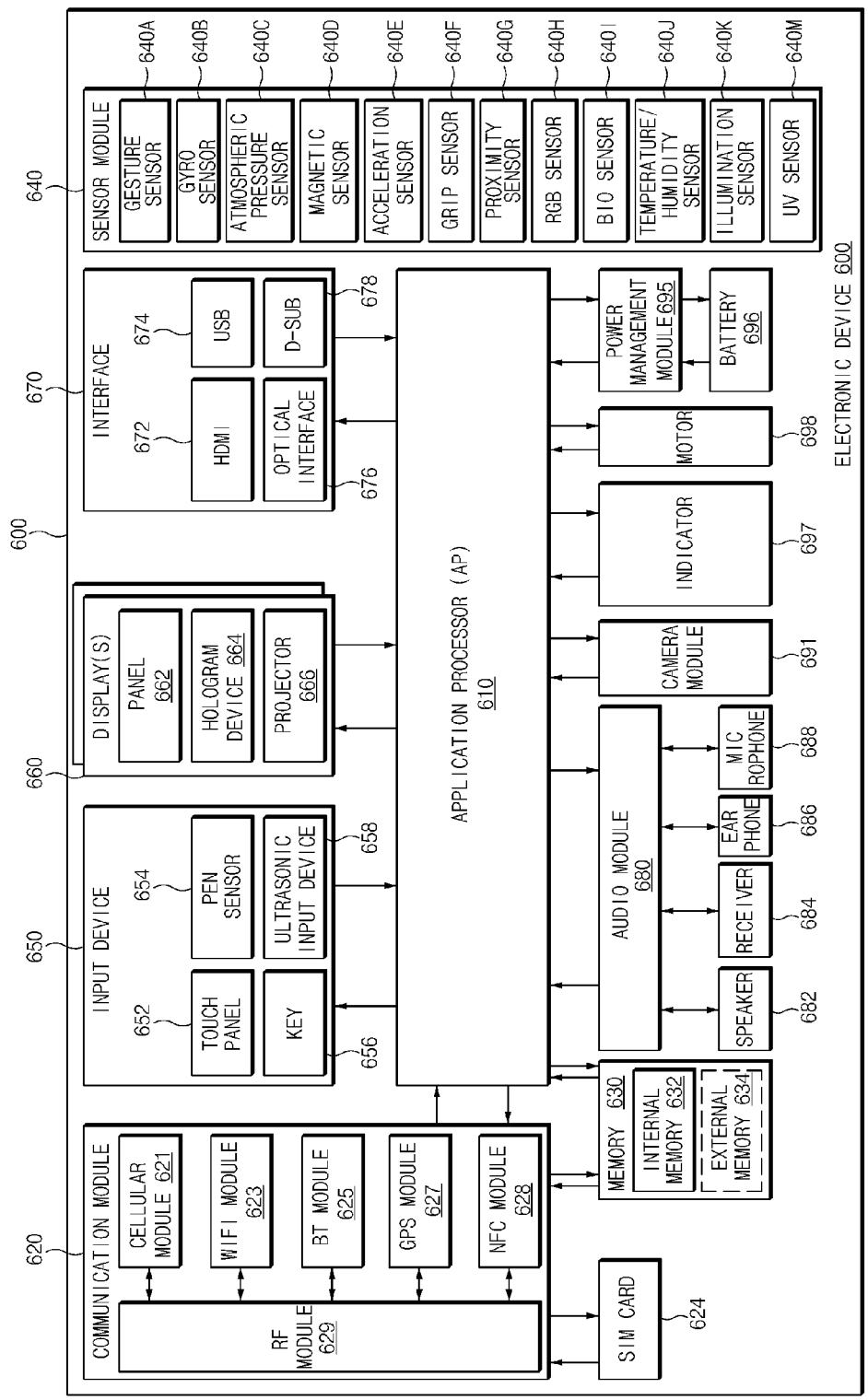
FIG. 6 is a block diagram showing an electronic device according to various embodiments of the present disclosure.

FIG. 6 is a block diagram showing an electronic device 600 according to an embodiment of the present disclosure.

Referring to FIG. 6, the electronic device 600 according to the present disclosure may include a whole or portion of the electronic device 101 as shown in FIG. 1. The electronic device 600 includes at least one application processor (AP) 610, a communication module 620, a Subscriber Identification Module (SIM) card 624, a memory 630, a sensor module 640, an input device 650, a display 660, an interface 670, an audio module 680, a camera module 691, a power management module 695, a battery 696, an indicator 697, and a motor 698.

The AP 610, such as a processor 120 as shown in FIG. 1, executes an operating system or an application program to control a plurality of hardware and software components connected to the AP 610 and performs processing and calculations on various pieces of data including multimedia data. The AP 610 may be implemented as a System on Chip (SoC), for example. According to an embodiment of the present disclosure, the AP 610 further includes a Graphics Processing Unit (GPU) (not shown). The AP 610 receives a command from other components (e.g., the communication module 620, the SIM card 624, the memory 630, the input device 650, or the display module 660, etc.), decrypts a received command, and performs calculations or data processing according to a decrypted command.

The AP 610, such as a management module 170 as shown in FIG. 1, processes at least some of the information obtained from other components (e.g., the communication module 620, the SIM card 624, the memory 630, the input device 650, the display module 660, etc.) and provides a user with a result by using various methods. When text is input from a user via the input device 650, the AP 610 checks vector data from the input text. The AP 610 uses checked vector data to generate masking data and mask stroke data with the generated masking data. The AP 610 removes the masking data in the order of strokes of the stroke data.

The communication module 620, such as a communication interface 160 as shown in FIG. 1, performs data transmission and reception when communication is conducted between the electronic device 600 (e.g., the electronic device 101) and other electronic devices connected thereto via a network. According to an embodiment of the present disclosure, the communication module 620 includes a cellular module 621, a WiFi module 623, a BT module 625, a GPS module 627, an NFC module 628, and a Radio Frequency (RF) module 629. The communication interface 620 receives at least one of at least one first TTF file and at least one second TTF file from an external device via wired or wireless communication and provides the AP 610 with a received file.

The cellular module 621 provides a voice call, a video call, a message service, or an Internet service via a communication network (such as an LTE, LTE-A, CDMA, WCDMA, UMTS, WiBro, GSM network, etc.). Also, the cellular module 621 uses, for example, a Subscriber Identity Module (such as a SIM card 624) to perform the identification and authentication of an electronic device in a communication network. According to an embodiment of the present disclosure, the cellular module 621 performs at least some of the functions that the AP 610 provides. For example, the cellular module 621 may perform at least some multimedia control functions.

According to an embodiment of the present disclosure, the cellular module 621 includes a communication processor (CP). Also, the cellular module 621 may be implemented in an SoC, for example. FIG. 6 shows components such as a cellular module 621 (e.g. a communication processor), a memory 630 and a power management module 695 separately from the AP 610, but, according to an embodiment of the present disclosure, the AP 610 may be implemented to include at least some (e.g. a cellular module 621) of the above-described components.

According to an embodiment of the present disclosure, the AP 610 or the cellular module 621 (e.g. a communication processor) loads, on volatile memories, commands or data received from at least one non-volatile memory connected thereto or another component, and processes the commands or data. Also, the AP 610 or the cellular module 621 stores, on non-volatile memories, data received from at least one other component or generated by at least one other component.

Each of the WiFi module 623, the BT module 625, the GPS module 627 and the NFC module 628 includes a processor for processing data transmitted and received via a corresponding module, for example. FIG. 6 shows each of the cellular module 621, the WiFi module 623, the BT module 625, the GPS module 627, and the NFC module 628 as a separate block, but, according to an embodiment of the present disclosure, at least some (e.g., two or more) of the cellular module 621, the WiFi module 623, the BT module 625, the GPS module 627, and the NFC module 628 may be included in one integrated circuit, or chip, (IC) or an IC package. For example, at least some (e.g. a communication processor corresponding to the cellular module 621 and a WiFi processor corresponding to the WiFi module 623) of the processors corresponding to the cellular module 621, the WiFi module 623, the BT module 625, the GPS module 627, and the NFC module 228, respectively, may be implemented in one SoC.

The RF module 629 performs data transmission and reception, such as RF signal transmission and reception. The RF module 629 includes e.g., a transceiver, a Power Amplifier Module (PAM), a frequency filter or a Low Noise Amplifier (LNA) though not shown. Also, the RF module 629 further include a component such as a conductor or a wire for transmitting or receiving electromagnetic waves in free space when performing wireless communication. Although FIG. 6 shows that the cellular module 621, the WiFi module 623, the BT module 625, the GPS module 627, and the NFC module 628 share one RF module 629, at least one of the cellular module 621, the WiFi module 623, the BT module 625, the GPS module 627, and the NFC module 628 may transmit and receive an RF signal via a separate RF module according to an embodiment of the present disclosure.

The SIM card 624 is a card including a Subscriber Identification Module and is inserted into a slot that is formed on a part of an electronic device. The SIM card 624 includes unique identification information (e.g. an Integrated Circuit Card Identifier (ICCID)) or subscriber information (such as an International Mobile Subscriber Identity (IMSI)). The SIM card 624 stores a true type font (TTF) file (hereinafter, referred to as a "first TTF file") as in the memory 130 in FIG. 1. The first TTF file includes the strokes of stroke data, the order of strokes, and vector data that includes a plurality of coordinates defined by the contour of the stroke data, and a curved or straight line that forms a contour by mutually connecting the plurality of coordinates. The contour may vary depending on the font type and font size of the stroke data. The SIM card 624 stores a TTF file (hereinafter, referred to as a "second TTF file") including additional information input from a user via the input device 650 or provided from an electronic device or a server. The second TTF file includes time information for generating at least one stroke that forms stroke data, delay time information between strokes, and speed or acceleration information when generating a stroke. The second TTF file includes strokes forming stroke data, the order of strokes, the contour of the stroke data and vector data that are included in the first TTF file, and includes central line information and maximum length information that are checked on the basis of the contour. In this case, the maximum length information may be information on a longest length that is orthogonal to the central line among coordinates defined by the contour.

The memory 630, such as a storage module 140 in FIG. 1, may include an internal memory 632 and an external memory 634. The internal memory 632 includes at least one of e.g., a volatile memory (e.g., a Dynamic RAM (DRAM), a Static RAM (SRAM), or a Synchronous Dynamic RAM (SDRAM)) and a non-volatile memory (such as a One-Time Programmable Read Only Memory (OTPROM), a Programmable ROM (PROM), an Erasable and Programmable ROM (EPROM), an Electrically Erasable and Programmable ROM (EEPROM), a mask ROM, a flash ROM, a NAND flash memory, or a NOR flash memory). The memory 630 stores a true type font (TTF) file (hereinafter, referred to as a "first ttf file") as in the memory 130 in FIG. 1. The first TTF file includes the strokes of stroke data, the order of strokes, and vector data that includes a plurality of coordinates defined from the contour of the stroke data, and a curved or straight line that forms a contour by mutually connecting the plurality of coordinates. The contour may vary depending on the font type and font size of the stroke data. The memory 630 stores a TTF file (hereinafter, referred to as a "second TTF file") including additional information input from a user via the input device 650 or provided from an electronic device or a server. The second TTF file includes time information for generating at least one stroke that forms stroke data, delay time information between strokes, and speed or acceleration information when generating a stroke. The second TTF file includes strokes forming stroke data, the order of strokes, the contour of the stroke data and vector data that are included in the first TTF file, and includes central line information and maximum length information that are checked on the basis of the contour. In this case, the maximum length information may be information on a longest length that is orthogonal to the central line among coordinates defined by the contour.

According to an embodiment of the present disclosure, the internal memory 632 is a Solid State Drive (SSD). The external memory 634 may further include a flash drive, such as a Compact Flash (CF) drive, a Secure Digital (SD) drive, a micro Secure Digital (micro-SD) drive, a mini Secure Digital (mini-SD) drive, or an extreme Digital (xD) drive, or a memory stick. The external memory 634 is functionally connected to the electronic device 600 via various interfaces. According to an embodiment of the present disclosure, the electronic device 600 further includes a storage device (or storage medium) such as an Hard Disk Drive (HDD).

The sensor module 640 measures a physical quantity, senses the operation state of the electronic device 600 and converts measured or sensed information into an electrical signal. The sensor module 640 includes at least one of a gesture sensor 640A, a gyro sensor 640B, an atmospheric pressure sensor 640C, a magnetic sensor 640D, an acceleration sensor 640E, a grip sensor 640F, a proximity sensor 640G, a color sensor 640H (such as a red, green, blue (RGB) sensor), a biometric sensor 640I, a temperature/humidity sensor 640J, an illumination sensor 640K or an ultra violet light (UV) sensor 640M, for example. Additionally or alternatively, the sensor module 640 includes an Electronic nose (E-nose) sensor, an ElectroMyoGraphy (EMG) sensor shown), an ElectroEncephaloGram (EEG) sensor, an ElectroCardioGram (ECG) sensor (not shown), an InfraRed (IR) sensor, an iris sensor or a fingerprint sensor (not shown). The sensor module 640 may further include a control circuit for controlling at least one sensor that is included in the sensor module 640.

The input device 650, such as the input and output interface 140 in FIG. 1, may include a touch panel 652, a (digital) pen sensor 654, a key 656 or an ultrasonic input device 658. The touch panel 652 recognizes a touch input by using at least one of a capacitive, pressure-sensitive, infrared or ultrasonic techniques, for example. Also, the touch pane 652 may further include a control circuit. In the case of the capacitive technique, a physical contact or proximity awareness may be included. The touch panel 652 may further include a tactile layer. In this case, the touch panel 652 provides a user with a tactile response. When text to be input is selected by a user, the input device 650 transfers the selected text to the AP 610.

The (digital) pen sensor 654 may be implemented by using the same or similar method as that of obtaining a user's touch input or by using a separate sheet for recognition, for example. The key 656 (e.g., the input module 120) may include a physical button, an optical key or a keypad, for example. The ultrasonic input device 658 is a device that senses a sound wave with a microphone from the electronic device 600 and checks data, via an input tool generating an ultrasonic signal, and the ultrasonic input device 256 thus performs wireless recognition. According to an embodiment of the present disclosure, the electronic device 600 uses the communication module 620 to receive a user input from an external device (e.g. a computer or server) connected thereto.

The display 660, such as a display 150 in FIG. 1, may include a panel 662, a hologram device 664, or a projector

666. The panel 662 may be a Liquid-Crystal Display (LCD) or an Active-Matrix Organic Light-Emitting Diode (AM-OLED), for example. The panel 662 may be implemented flexibly, transparently or wearably, for example. The panel 662 may also be integrated into the touch panel 652 so that they are implemented in one module. The hologram device 664 uses the interference of light to show a stereoscopic image in the air. The projector 666 projects light onto a screen to display an image. The screen may be located internal or external to the electronic device 600. According to an embodiment of the present disclosure, the display 660 may further include a control circuit for controlling the panel 662, the hologram device 664 or the projector 666.

The interface 670 may include a High-Definition Multimedia Interface (HDMI) 672, a Universal Serial Bus (USB) 674, an optical interface 676 or a D-subminiature connector (D-sub) 678, for example. Additionally or alternatively, the interface 670 may include a Mobile High-definition Link (MHL) interface, an SD card/Multi-Media Card (MMC) interface or an InfraRed Data Association (IrDA) interface, for example.

The audio module 680 converts sound into an electrical signal or vice versa. The audio module 680 processes sound information input or output via a speaker 682, a receiver 684, an earphone 686 or a microphone 688, for example.

The camera module 691 is a device that captures still pictures and moving pictures, and, according to an embodiment of the present disclosure, includes one or more image sensors (e.g., front sensor or rear sensor), lenses, an Image Signal Processor (ISP), or a flash (e.g., an Light Emitting Diode (LED) or a xenon lamp).

The power management module 695 manages the power of the electronic device 600. Although not shown, the power management module 695 may include a Power Management Integrated Circuit (PMIC), a charger IC, or a battery or fuel gauge, for example.

The PMIC may be included in an IC or an SoC semiconductor, for example. Charging techniques are classified into wired and wireless techniques. The charger IC charges a battery and prevents overvoltage or overcurrent from a charger. According to an embodiment of the present disclosure, the charger IC may include a charger IC for at least one of a wired charging technique and a wireless charging technique. The wireless charging technique includes, for example, a magnetic resonance type, a magnetic induction type, an electromagnetic wave type, and a circuit for wireless charging (e.g., a coil loop, a resonance circuit, a rectifier, etc.).

The battery gauge measures the level, current or temperature of the battery 696, or the voltage of the battery 1196 during charging, for example. The battery 696 stores or generates electricity and uses stored or generated electricity to supply power to the electronic device 600. The battery 696 may include a rechargeable battery or a solar battery, for example.

The indicator 697 shows the specific states of the electronic device 600 or a portion (e.g., the AP 610) of the electronic device 600, such as a booting state, a message state or a charged state. The motor 698 converts an electrical signal into mechanical vibration. Although not shown, the electronic device 600 may include a processing device (e.g., a GPU) for supporting a mobile TV. The processing device for supporting the mobile TV processes media data according to a standard such as Digital Multimedia Broadcasting (DMB), Digital Video Broadcasting (DVB) or media flow.

An electronic device and method for providing handwriting animation according to various embodiments of the present disclosure uses the vector data of selected text to generate masking data and sequentially display a portion of the text by masking data removed based on the order of strokes of the text so that it is possible to provide handwriting animation in the order of strokes when displaying text data as described above.

Each of the above-described elements of the electronic device according to the present disclosure may include one or more components and the names of corresponding elements may vary depending on the type of electronic device. The electronic device, according to the present disclosure, may include at least one of the above-described elements, and some elements may be left out or other elements may be further included. Also, some of the elements of the electronic device, according to the present disclosure, are combined to form an entity, which may equally perform the functions of corresponding elements before being combined.

The term "module" used in the present disclosure may mean a unit including one of hardware, software and firmware or a combination of two or more thereof, for example. The "module" may be interchangeably used with the term "unit", "logic", "logical block", "component", or "circuit", for example. The "module" may be an elementary unit of or a portion of an integral component. The "module" may also be an elementary unit for performing one or more functions or a portion of the elementary unit. The "module" may be implemented mechanically or electronically. For example, the "module," according to the present disclosure, may include at least one of an Application-Specific Integrated Circuit (ASIC) chip, a Field-Programmable Gate Array (FPGA) and a programmable-logic device that performs some operations and is known or will be developed.

According to various embodiments of the present disclosure, at least some of devices (e.g., modules or their functions) or methods (e.g. steps), according to the present disclosure, may be implemented as commands stored in a non-transitory computer-readable recording medium in the form of a programming module, for example. When the command is executed by one or more processors, the one or more processors may execute a function corresponding to the command. The non-transitory computer-readable recording medium may be a memory, for example. At least a portion of the programming module may be implemented (e.g., performed) by the processor, for example. At least a portion of the programming module may include, for example, a module, a program, a routine, a set of instructions or a process for executing one or more functions.

The non-transitory computer-readable recording medium may include a magnetic medium such as a hard disk, a floppy disk, a magnetic tape, an optical medium such as a Compact Disk Read Only Memory (CD-ROM) and a Digital Versatile Disc (DVD), a magneto-optical medium such as a floptical disk, and a hardware device that is especially configured to store and execute a program command (e.g. a programming module) such as a Read Only Memory (ROM), a Random Access Memory (RAM), and a flash memory. Also, the program command may include a machine code made by a compiler as well as a high-level language code that may be executed by a computer by using an interpreter. The above-described hardware device may be configured to operate by one or more software modules to execute the operations of the present disclosure and vice versa.

The module or programming module, according to the present disclosure, may include at least one of the above-described elements, leave out some elements or further include other elements. Operations executed by a module, according to the present disclosure, a programming module or another element may be executed by using a sequential, parallel, repetitive or heuristic method. Also, the execution order of some operations may vary, some operations may be left out or further operations may be added.

In addition, embodiments of the present disclosure disclosed in the specification and the drawings only present examples to easily describe the technical details of the present disclosure and to facilitate understanding of the present disclosure and are not intended to limit the scope of the present disclosure. Thus, it should be understood that all changed or modified forms derived from the scope and spirit of the present disclosure in addition to the disclosed embodiments are included in the scope of the present disclosure as defined in the claims, and their equivalents.

What is claimed is:

1. An electronic device, comprising:
    an input and output interface configured to receive a text selection signal; and
    a management module configured to use vector data for stroke data on text to generate at least one piece of masking data, mask the stroke data with the masking data, and sequentially remove the masking data.

2. The electronic device according to claim 1, wherein the management module is further configured to allocate a first memory space for the masking data and a second memory space for the stroke data.

3. The electronic device according to claim 2, wherein the management module is further configured to accumulate the stroke data corresponding to the masking data in the order that the masking data is removed, to generate text data.

4. The electronic device according to claim 1, wherein the management module is further configured to check a contour of the stroke data and check vector data that includes a plurality of coordinates defined by the contour and any one of at least one straight line or curved line connecting the coordinates.

5. The electronic device according to claim 4, wherein the management module is further configured to use the plurality of coordinates to check at least one central point and connect the at least one central point to obtain a central line of the stroke data.

6. The electronic device according to claim 5, wherein the management module is further configured to use a maximum length being a longest length orthogonal to the central line among the plurality of coordinates to generate the masking data.

7. The electronic device according to claim 6, wherein the management module is configured to check a point of inflection where two or more central lines form an angle.

8. The electronic device according to claim 6, further comprising a third memory space configured to store additional information on the stroke data.

9. The electronic device according to claim 8, wherein the management module is further configured to remove the masking data based on the additional information.

10. The electronic device according to claim 9, wherein the additional information includes time information for generating at least one stroke forming the stroke data, delay time information between two or more of the at least one stroke, and information on any one of a speed or acceleration when a stroke is generated.

11. A method of providing handwriting animation, comprising:
    checking vector data for stroke data on selected text;
    generating at least one piece of masking data from the vector data;
    masking the stroke data with the masking data; and
    sequentially removing the masking data.

12. The method according to claim 11, further comprising, after sequentially removing the masking data, accumulating the stroke data corresponding to the masking data in the order that the masking data is removed, to generate text data.

13. The method according to claim 11, wherein checking vector data for stroke data on selected text comprises checking a contour of the stroke data and checking vector data that comprises a plurality of coordinates defined by the contour and any one of at least one straight line or curved line connecting the coordinates.

14. The method according to claim 11, wherein generating at least one piece of masking data comprises:
    using the plurality of coordinates to check at least one central point;
    connecting at least one central point to obtain a central line of at least one piece of the stroke data;
    checking a maximum length being a longest length orthogonal to the central line among the plurality of coordinates; and
    using the maximum length to generate the masking data.

15. The method according to claim 14, wherein generating at least one piece of masking data further comprises checking a point of inflection where two or more central lines form an angle.

16. The method according to claim 15, wherein sequentially removing the masking data further comprises checking additional information that comprises time information for generating at least one stroke forming the stroke data, delay time information between two or more of the at least one stroke, and information on any one of a speed or acceleration when a stroke is generated.

17. The method according to claim 16, wherein sequentially removing the masking data comprises sequentially removing the masking data based on checked additional information.

* * * * *